(12) United States Patent
Lee (10) Patent No.: US 10,807,698 B2
(45) Date of Patent: Oct. 20, 2020

(54) UNFOLDING PROPELLER UNIT TYPE UNMANNED AERIAL VEHICLE

(71) Applicant: Korea Aerospace Research Institute, Yuseong-gu Daejeon (KR)

(72) Inventor: Seon Ho Lee, Daejeon (KR)

(73) Assignee: KOREA AEROSPACE RESEARCH INSTITUTE, Daejeon (KR)

(*) Notice: Subject to any disclaimer, the term of this patent is extended or adjusted under 35 U.S.C. 154(b) by 375 days.

(21) Appl. No.: 15/579,708

(22) PCT Filed: Dec. 9, 2015

(86) PCT No.: PCT/KR2015/013412
§ 371 (c)(1),
(2) Date: Dec. 5, 2017

(87) PCT Pub. No.: WO2016/199995
PCT Pub. Date: Dec. 15, 2016

(65) Prior Publication Data
US 2018/0178896 A1    Jun. 28, 2018

(30) Foreign Application Priority Data

Jun. 9, 2015 (KR) .................. 10-2015-0081254
Jul. 2, 2015 (KR) .................. 10-2015-0094614

(51) Int. Cl.
*B64C 1/30* (2006.01)
*B64C 27/08* (2006.01)
(Continued)

(52) U.S. Cl.
CPC ............... *B64C 1/30* (2013.01); *B64C 11/28* (2013.01); *B64C 27/08* (2013.01); *B64C 27/50* (2013.01);
(Continued)

(58) Field of Classification Search
CPC .......... B64C 1/30; B64C 11/28; B64C 27/08; B64C 27/50; B64C 39/024;
(Continued)

(56) References Cited

U.S. PATENT DOCUMENTS 10,549,850 B1 * 2/2020 Ryan ................ B64C 27/08
2014/0313332 A1 * 10/2014 Sabe .................. G05D 1/0094
348/144

(Continued)

FOREIGN PATENT DOCUMENTS

CN        104085530 A     10/2014
CN        203958613 U     11/2014
(Continued)

OTHER PUBLICATIONS

Int'l Search Report dated Mar. 21, 2016 in Int'l Application No. PCT/KR2015/013412.

*Primary Examiner* — Rodney A Bonnette
(74) *Attorney, Agent, or Firm* — Panitch Schwarze Belisario & Nadel LLP (57) ABSTRACT

The present invention discloses an unfolding propeller unit type unmanned aerial vehicle including a body unit, a plurality of propeller units in which propellers are installed, a locking unit configured to lock the propeller units so that a state in which the propeller units are overlapping on the body unit is maintained, and propeller unit unfolders, each configured to connect each of the propeller units to the body unit, and unfold the propeller unit from the body unit so the propeller units are positioned around the body unit when locking of the locking unit is released.

9 Claims, 9 Drawing Sheets

(51) Int. Cl.
*B64C 11/28* (2006.01)
*B64C 27/50* (2006.01)
*B64C 39/02* (2006.01)

(52) U.S. Cl.
CPC ...... *B64C 39/024* (2013.01); *B64C 2201/027* (2013.01); *B64C 2201/108* (2013.01); *B64C 2201/20* (2013.01)

(58) Field of Classification Search
CPC ........ B64C 2201/027; B64C 2201/108; B64C 2201/20; Y02T 50/44
See application file for complete search history.

(56) References Cited

U.S. PATENT DOCUMENTS

| | | | | |
|---|---|---|---|---|
| 2016/0376004 | A1* | 12/2016 | Claridge | A63H 27/12 |
| | | | | 701/3 |
| 2018/0093753 | A1* | 4/2018 | Chow | B64C 39/024 |
| 2018/0148168 | A1* | 5/2018 | Newman | B64C 27/08 |
| 2019/0112025 | A1* | 4/2019 | Sugaki | B64C 39/02 |

FOREIGN PATENT DOCUMENTS

| | | |
|---|---|---|
| CN | 104443376 A | 3/2015 |
| KR | 10-1456035 B1 | 11/2014 |
| KR | 10-1461059 B1 | 11/2014 |
| KR | 2014-0134587 A | 11/2014 |
| KR | 10-1468997 B1 | 12/2014 |
| KR | 101468997 B1 | 12/2014 |

\* cited by examiner

UNFOLDING PROPELLER UNIT TYPE UNMANNED AERIAL VEHICLE

CROSS-REFERENCE TO RELATED APPLICATIONS

This application is a section 371 of International Application No. PCT/KR2015/013412, filed Dec. 9, 2015, which was published in the Korean language on Dec. 15, 2016, under international publication no. WO 2016/199995 A1, which claims the benefit to Korean Application No. 10-2015-0081254 and Korean Application No. 10-2015-0094614, the disclosure of each of which is incorporated herein by reference in its entirety.

BACKGROUND

1. Field of the Invention

The present invention relates to an unfolding propeller unit type unmanned aerial vehicle which allows propeller units overlapping on a body to be unfolded and positioned around the body.

2. Discussion of Related Art

Generally, an unmanned aerial vehicle (UAV) refers to an aerial vehicle for autonomous flight without a pilot by recognizing and determining a surrounding environment (obstacles, flight paths) according to a previously input program or by the aerial vehicle itself. Unmanned aerial vehicles are used in various fields and mainly used as unmanned surveillance aircraft for military purposes, in natural disasters and disaster prevention, aerial photography of changes in terrain and environment, and filming for broadcast. Recently, the use of unmanned aerial vehicles has become prominent in the field of space development.

Figure 1:
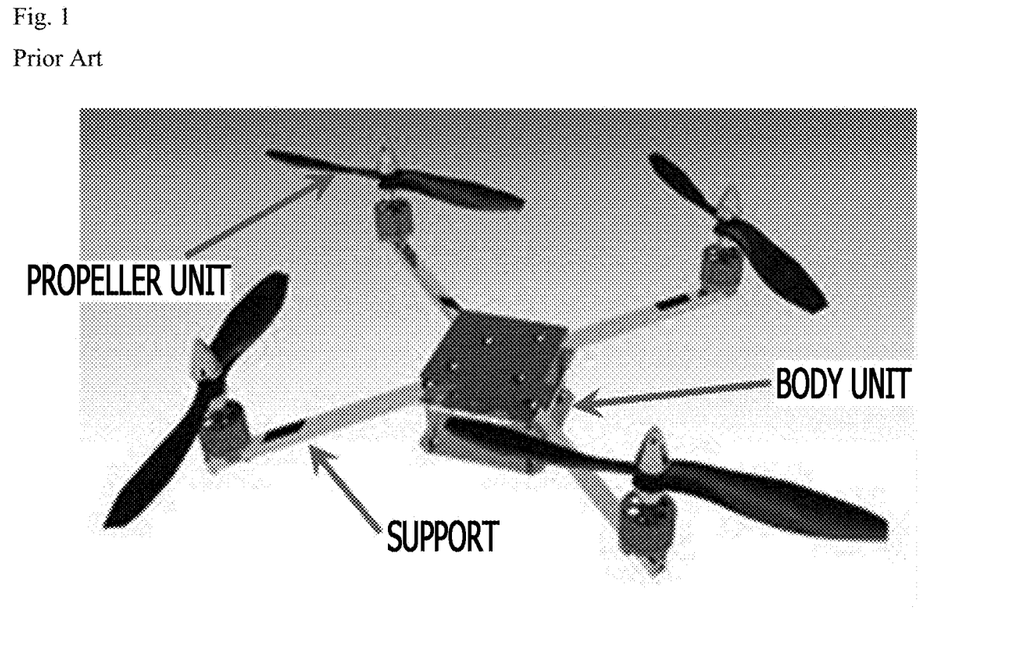
FIGS. 1 and 2 are views illustrating an unmanned aerial vehicle of a conventional art.
Figure 2:
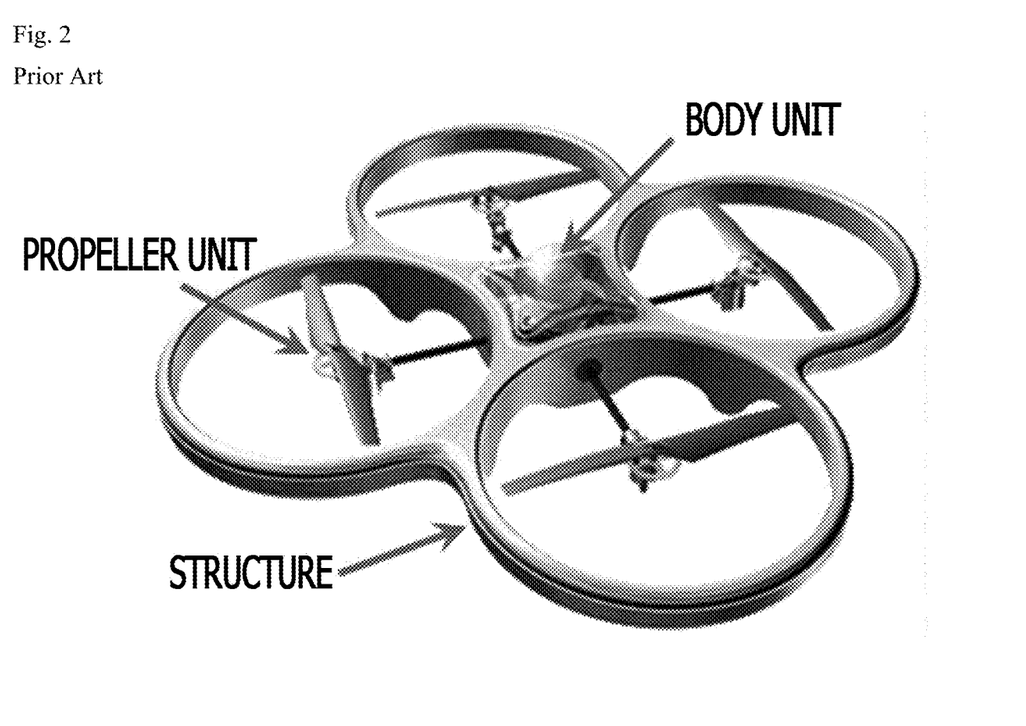

As shown in FIGS. 1 and 2, an unmanned aerial vehicle generally has a structure in which a plurality of propeller units are disposed around a body having electronic components mounted therein. The unmanned aerial vehicle can use supports to connect the body and the propeller units as shown in FIG. 1 or can have a shape in which the propeller units are installed in a structure in which the body is equipped as shown in FIG. 2.

However, when these supports or structure is used, the volume and weight of the unmanned aerial vehicle are increased and the unmanned aerial vehicle is difficult to store and transport. Further, since the supports or structure is formed of a rigid material, the unmanned aerial vehicle has a high possibility of becoming deformed or damaged upon collision with external objects in flight.

SUMMARY OF THE INVENTION

The present invention is directed to an unmanned aerial vehicle which has a reduced volume and weight and is easy to store and carry in comparison with that of a conventional art.

According to an aspect of the present invention, there is disclosed an unfolding propeller unit type unmanned aerial vehicle including a body unit, a plurality of propeller units in which propellers are installed, a locking unit configured to lock the propeller units so that a state in which the propeller units are overlapping on the body is maintained, and propeller unit unfolders configured to connect the body unit and the propeller units and unfold the propeller units from the body unit so the propeller units are positioned around the body unit when locking of the locking unit is released.

The unfolding propeller unit may be elastically deformed to unfold the propeller unit from the body unit through an elastic restoring force and may be formed of a flexible material.

The propeller unit unfolder may include a tape spring hinge or a shape memory alloy hinge.

The propeller unit unfolders units may be installed at a plurality of positions along a circumference of the body unit.

The plurality of the propeller units may be sequentially stacked on one surface of the body unit.

Some of the plurality of the propeller units may be sequentially stacked on one surface of the body unit, and the remaining propeller units may be sequentially stacked on the other surface of the body unit.

The locking unit may include a mechanical type locking device which is manually unlocked or an electronic type locking device which is unlocked in response to a control signal transmitted from the body unit.

The body unit may include a first and second body unit connected to each other so that the first body unit and the second body unit in an overlapping state are unfolded by body unit unfolders.

According to another aspect of the present invention, there is disclosed an unfolding propeller unit type unmanned aerial vehicle including a plurality of body units configured to be overlappable with each other, a body unit unfolder configured to connect the plurality of the body units and switch the body units from an overlapping state to an unfolded state, a plurality of propeller units configured to be overlappable on the body units, and propeller unit unfolders configured to connect the body units and the propeller units and unfold the propeller units from the body units according to the unfolding operation of the body unit unfolders.

The body units may be connected to each other in series by the body unit unfolders, and the propeller units may be connected to the body units by the propeller unit unfolders in a direction different from a direction in which the body unit unfolders connect the body units.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an unfolding propeller unit type unmanned aerial vehicle according to embodiments of the present invention will be described in more detail with reference to the accompanying drawings.

Figure 3:
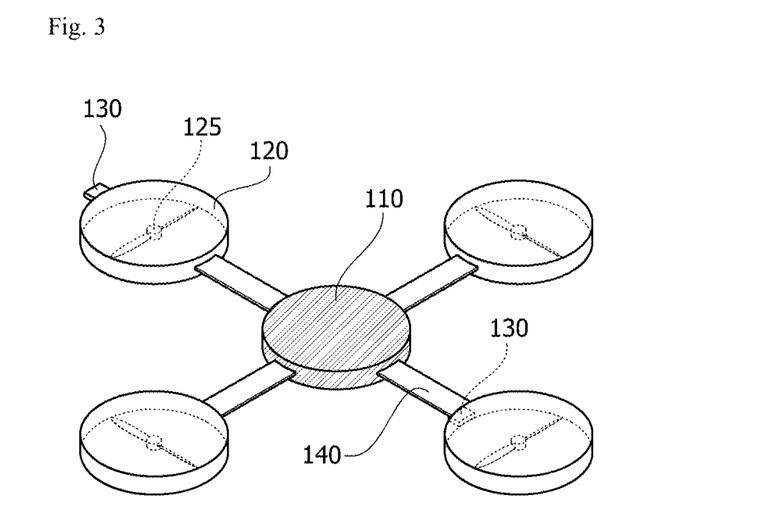
FIGS. 3 and 4 are perspective views illustrating an unfolding propeller unit type unmanned aerial vehicle according to one embodiment of the present invention.
Figure 4:
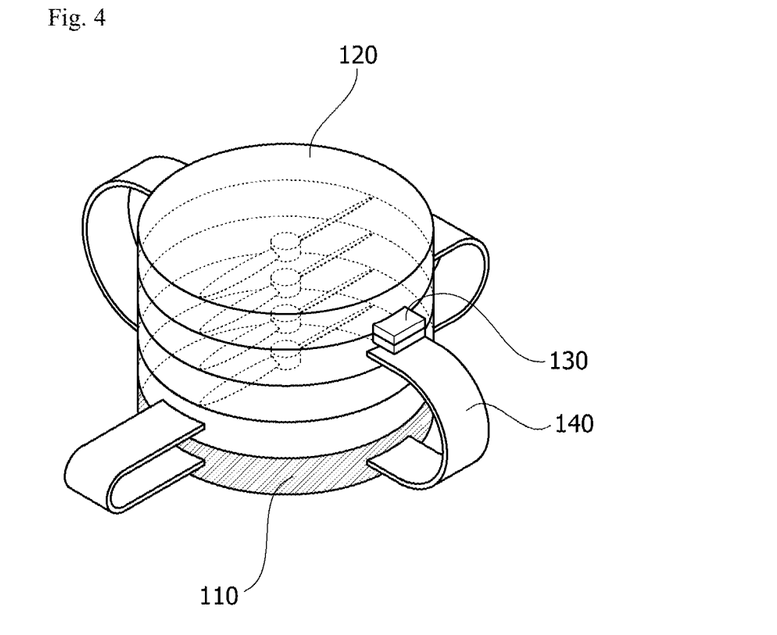

FIGS. 3 and 4 are perspective views illustrating an unfolding propeller unit type unmanned aerial vehicle according to one embodiment of the present invention, wherein FIG. 3 shows an unfolded state of propeller units and FIG. 4 shows a folded state of the propeller units.

The unfolding propeller unit type unmanned aerial vehicle in the embodiment includes a body unit 110, propeller units 120, locking units 130, and propeller unit unfolders 140.

The body unit 110 includes electronic components such as a control module, a sensor module, a communication module, a battery, and the like, and the components in the body unit 110, such as the control module and the battery, are electrically connected to the propeller units 120.

The propeller unit 120 may include propellers 125 operated by power provided by the body unit 110 and may be operated by a driver such as a motor. The plurality of propeller units 120 may be provided around the body unit 110 as shown in FIG. 3, the unmanned aerial vehicle may be implemented as various types of unmanned aerial vehicles such as a tri-rotor type unmanned aerial vehicle, a quad-rotor type unmanned aerial vehicle, a penta-rotor type unmanned aerial vehicle, a hexa-rotor type unmanned aerial vehicle, and an octo-rotor type unmanned aerial vehicle according to the number of the propeller units 120.

Further, the propeller units 120 may be in the folded state in which the propeller units 120 are overlapping on the body unit 110 as shown in FIG. 4. The propeller units 120 and the body unit 110 may have flat upper surfaces and flat lower surfaces to come into surface-contact with each other and may have identical exteriors (or outer surfaces) in order to have an integral shape in the folded state as shown in FIG. 4.

The locking units 130 function to lock the propeller units 120 so that a state in which the propeller units 120 are overlapping on the body unit 110 is maintained. A mechanical type locking device which is manually unlocked or an electronic type locking device which is unlocked in response to a control signal transmitted from the body unit 110 may be used as the locking unit 130.

The propeller unit unfolders 140 connect the propeller units 120 to the body unit 110 and are formed to unfold the propeller units 120 so that the propeller units 120 are positioned around the body unit 110 when locking of the locking units 130 is released. The propeller unit unfolders 140 may be installed at a plurality of positions along a circumference around a side surface of the body unit and may be installed to be spaced a predetermined interval from each other according to the embodiment.

The propeller unit unfolder 140 may be formed of a material which is flexible and elastically deformable so as to unfold the propeller unit 120 through an elastic restoring force. The propeller unit unfolder 140 may include a tape spring hinge, a shape memory alloy hinge, etc.

For example, in a case in which a tape spring hinge is used as the propeller unit unfolder 140, the tape spring hinge is elastically deformed and generates an elastic restoring force when the propeller units 120 are folded and the locking unit 130 fixes the propeller unit 120 to prevent the propeller unit unfolder 140 from being elastically restored. When the locking of the locking unit 130 is released, the propeller units 120 are unfolded through the elastic restoring force of the propeller unit unfolder 140.

According to the embodiment, the plurality of the propeller units 120 may have a structure in which the plurality of the propeller units 120 are sequentially stacked on one side of the body unit 110, and the locking unit 130 may fix and may be disposed between an outermost propeller unit among the plurality of the propeller units 120 and another propeller unit under the outermost propeller unit. The embodiment is advantageous for fixing all positions of propeller units 120 with only one locking unit 130.

Figure 5:
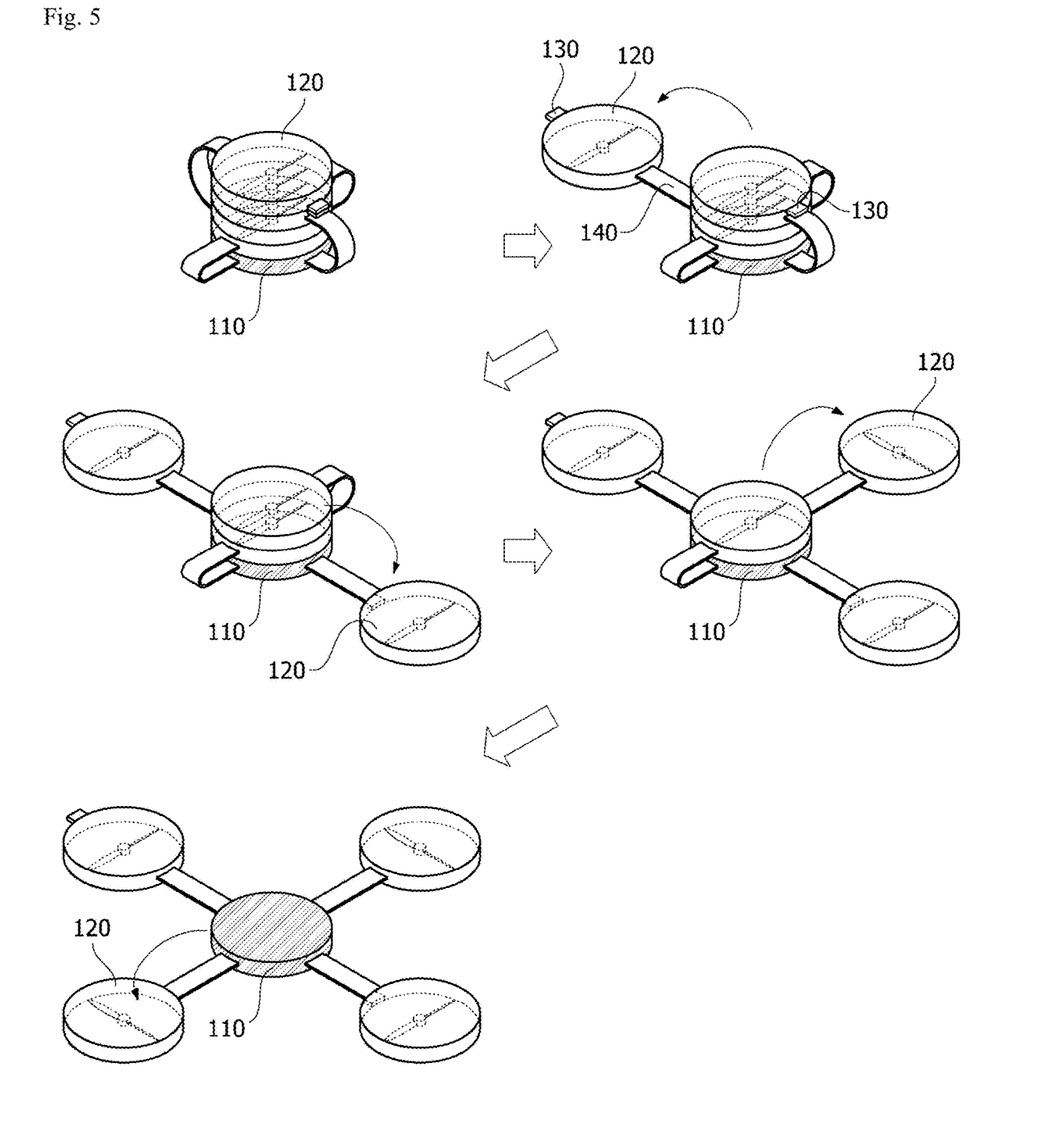
FIG. 5 is a view illustrating a process of switching the unfolding propeller unit type unmanned aerial vehicle in FIGS. 3 and 4 from a folded state to an unfolded state.

FIG. 5 illustrates a process of switching the propeller units 120 from a folded state to an unfolded state. As shown in FIG. 5, the folded state of the plurality of the propeller units 120 is maintained in a locking state of the locking units 130.

When locking of the locking unit 130 released, the propeller units 120 are unfolded through the elastic restoring force of the propeller unit unfolder 140. In this case, the outermost propeller unit 120 is first unfolded from the body unit 10, and then all the remaining propeller units 120 are sequentially unfolded therefrom.

Figure 6:
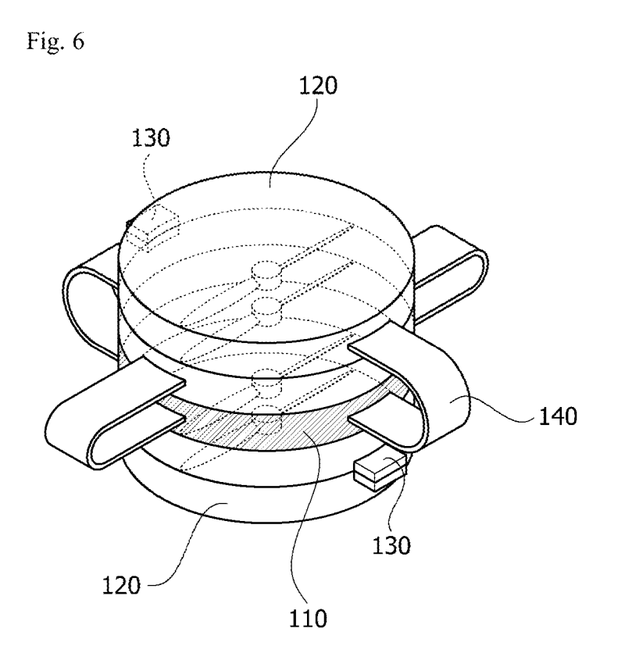
FIG. 6 is a perspective view illustrating an unfolding propeller unit type unmanned aerial vehicle according to another embodiment of the present invention.

FIG. 6 is a perspective view of an unfolding propeller unit type unmanned aerial vehicle according to another embodiment of the present invention and shows a folded state of propeller units.

According to the embodiment, some of a plurality of propeller units 120 are sequentially stacked on one surface of a body unit 110, and the remaining propeller units 120 are sequentially stacked on the other surface of the body unit 110. In FIG. 6, two propeller units 120 among the four propeller units 120 are disposed on one surface of the body unit 110, and the remaining two propeller units 120 are disposed on the other surface of the body unit 110.

According to the embodiment, locking units 130 are provided at each of the one side and the other side of the body unit 110. Specifically, one locking unit 130 is disposed between an outermost propeller unit among the propeller units 120 on the one side of the body unit 110 and one locking unit 130 is disposed under the outermost propeller unit, and one locking unit 130 is disposed between an outermost propeller unit among the propeller units 120 on the other side of the body unit 110 and one locking unit 130 is provided on the outermost propeller unit.

Figure 7:
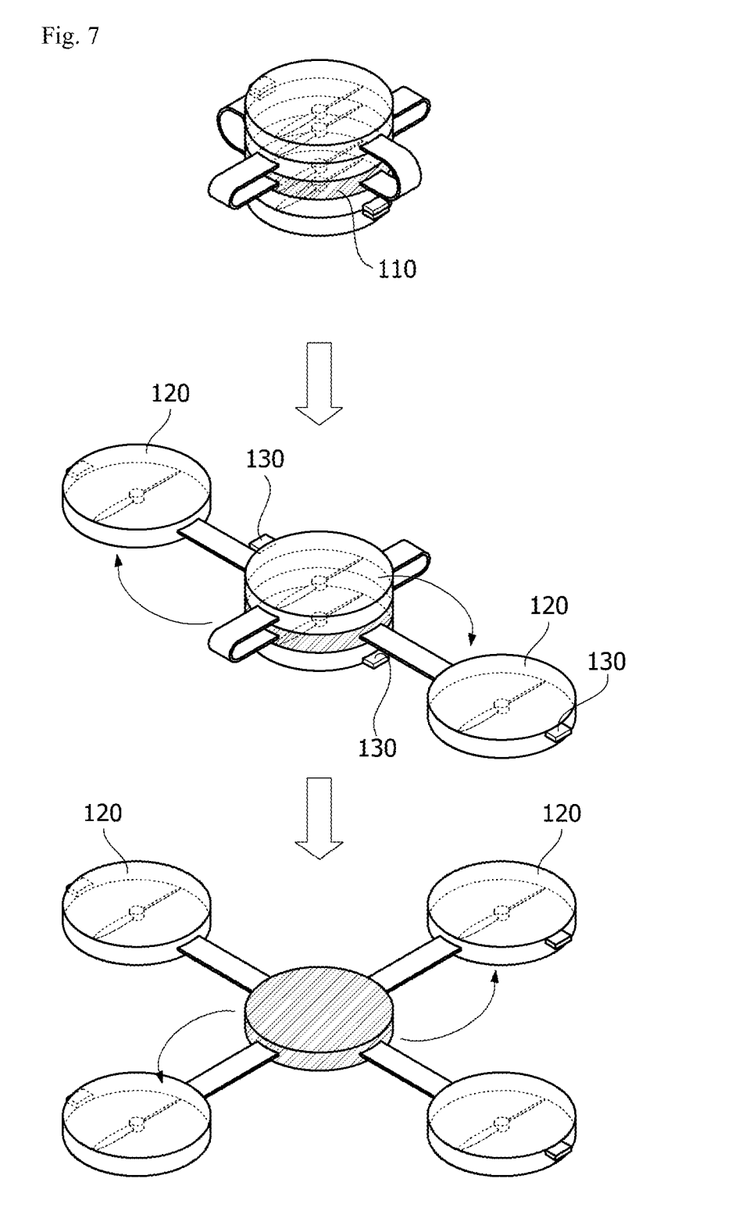
FIG. 7 is a view illustrating a process of switching the unfolding propeller unit type unmanned aerial vehicle in FIG. 6 from a folded state to an unfolded state.

FIG. 7 illustrates a process of switching the unfolding type unmanned aerial vehicle according to the embodiment from a folded state to an unfolded state. As shown in FIG. 7, outermost propeller units 120 are first unfolded from both sides of the body unit 110, and then all the remaining propeller units 120 are sequentially unfolded therefrom. The outermost propeller units 120 on both sides of the body unit 110 are simultaneously unfolded from the body unit 10 first, and then the remaining propeller units 120 positioned inward from the outermost propeller units 120 are simultaneously unfolded therefrom second. In the embodiment, since an unfolding process is simultaneously performed on both sides of the body unit 110, the separation process is performed faster than that of the previous embodiment (four-stage unfolding).

Figure 8:
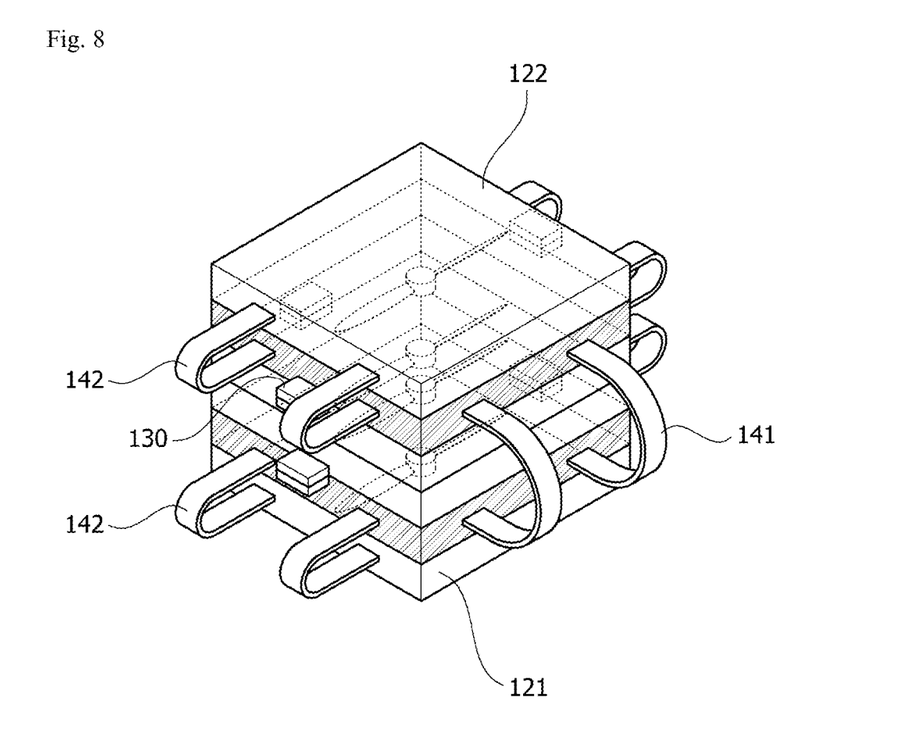
FIG. 8 is a perspective view illustrating an unfolding propeller unit type unmanned aerial vehicle according to still another embodiment of the present invention.
Figure 9:
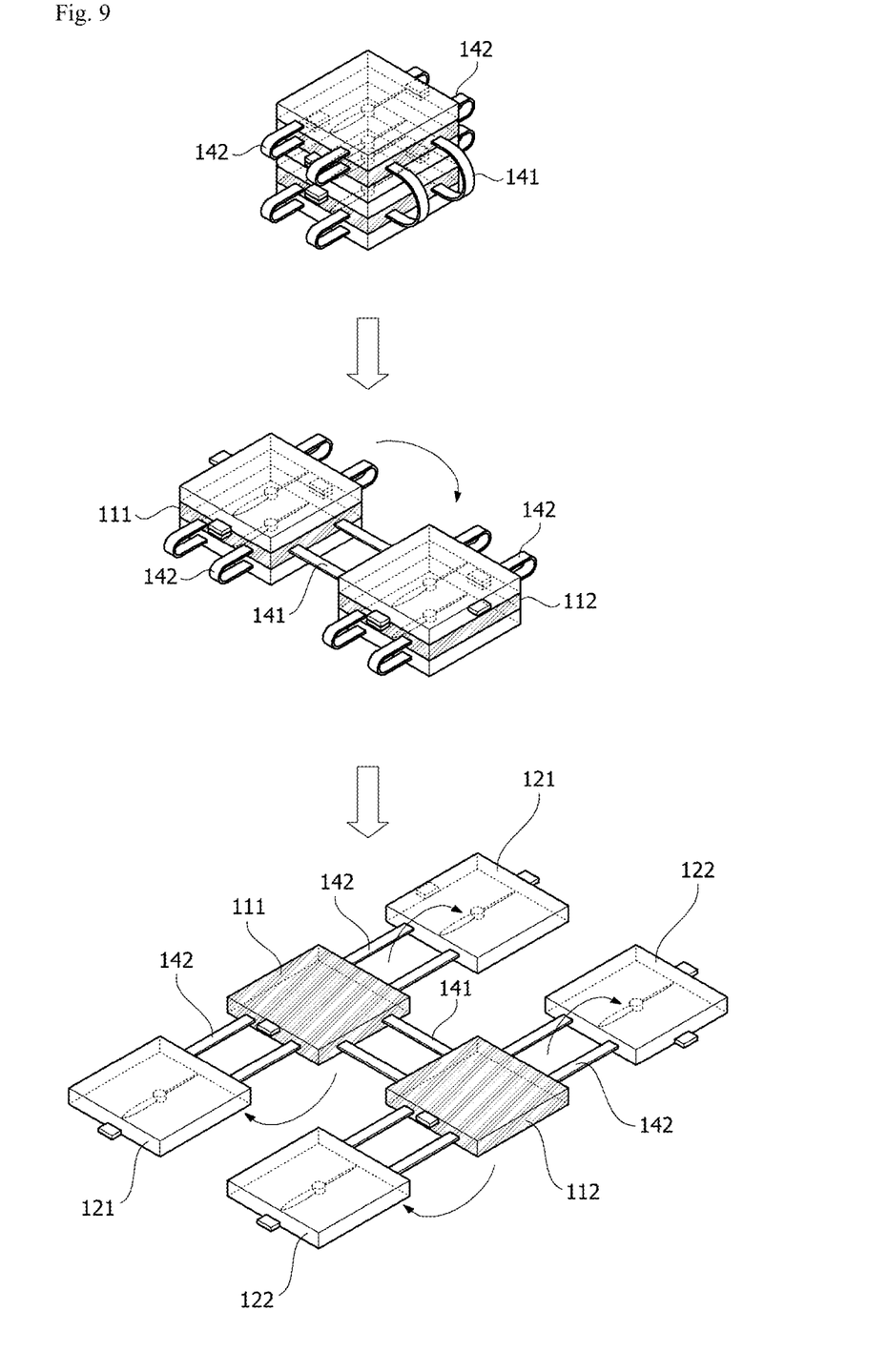
FIG. 9 is a view illustrating a process of switching the unfolding propeller unit type unmanned aerial vehicle in FIG. 8 from a folded state to an unfolded state.

FIG. 8 is a perspective view of an unfolding propeller unit type unmanned aerial vehicle according to still another embodiment of the present invention, and FIG. 9 illustrates a process of switching the unfolding propeller unit type unmanned aerial vehicle in FIG. 8 from a folded state to an unfolded state.

In the embodiment, unlike the body unit 110 in the above-described embodiments, separate body units 111 and 112 are disclosed. A first body unit 111 and a second body unit 112 are configured to be switchable from an overlapping state to an unfolded state and are connected to each other by body unit unfolders 141.

As described above, since separate body units 111 and 112 are formed, components forming the body units 111 and 112 may be disposed in a distributive or multiplex manner. For example, particular components may be embedded in the first body unit 111 without being embedded in the second body unit 112, and other particular components may be embedded in both the first and second body units 111 and 112.

For example, a main control module is disposed in the first body unit 111 and an auxiliary control module is disposed in the second body unit 112. The auxiliary control module may serve to perform a function of the main control module when a malfunction occurs in the main control module, and thus a malfunction tolerance of the unfolding propeller unit type unmanned aerial vehicle can be improved. Further, two or more cameras may be disposed in the body units 111 and 112 in a distributive manner, and thus a stereo image may be captured by one unmanned aerial vehicle.

Propeller units 120, i.e., 121 and 122, are connected to the first body unit 111 and the second body unit 112 by propeller unit unfolders 142, and the propeller units 121 and 122 are connected to the body units 111 and 112 so as to be switchable from the overlapping state to the unfolded state. In the embodiment, the body units 111 and 112 and the propeller units 121 and propeller units 122 have a rectangular parallelepiped box shape, unlike those in the above-described embodiments having a cylindrical shape.

In the embodiment, although the propeller units 121 are disposed to overlap on both surfaces of the first body unit 111 and the propeller units 122 are disposed to overlap on both surfaces of the second body unit 112, the propeller units 121 and 122 may be sequentially stacked on one surfaces of the body units 111 and 112.

Body unit unfolders 141 have the same configuration as that of the above-described propeller unit unfolders 140, and descriptions thereof are replaced with the above descriptions. Further, locking units 130 may be disposed between the propeller units 121 and the propeller units 122 which are in contact with each other in a folded state, and between the body units 111 and 112 and the propeller units 121 and 122 which are stacked on both surfaces of the body units 111 and 112.

Referring to FIG. 9, as locking of the locking units 130 is released, the body unit unfolders 141 perform an unfolding operation so that the first and second body units 111 and 112 are unfolded first, and then the propeller unit unfolders perform an unfolding operation so that the propeller units 121 stacked on both surfaces of the first body unit 111 and propeller units 122 stacked on both surfaces of the second body unit 112 are unfolded from the body units second.

Figure 10:
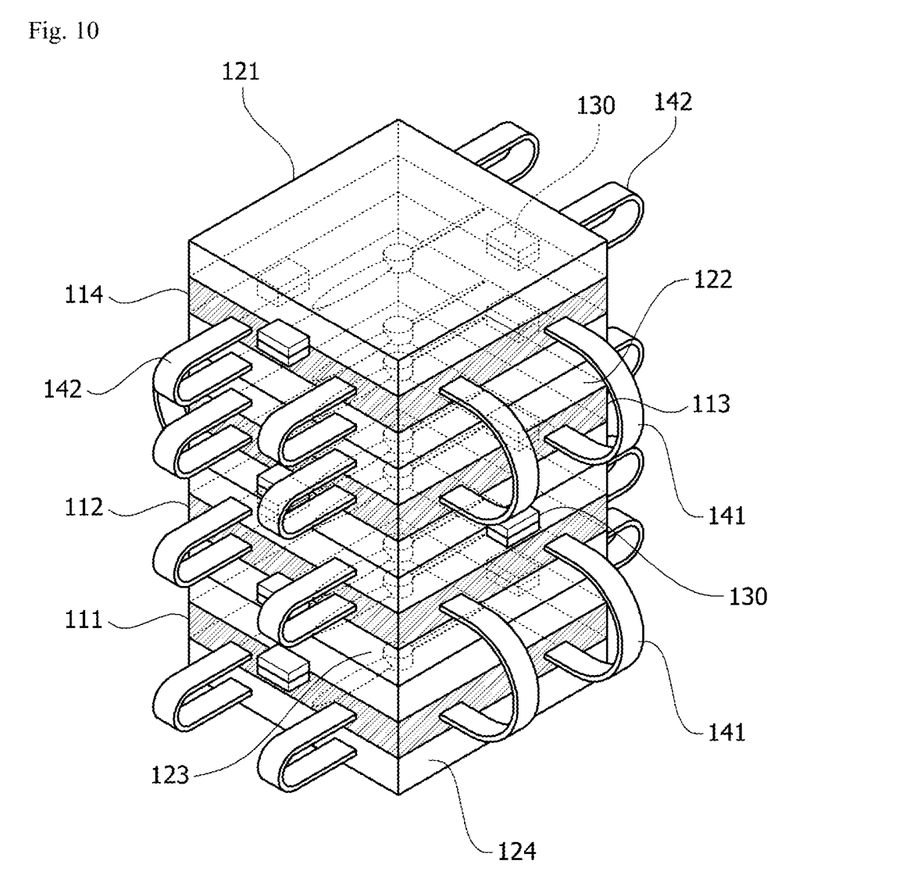
FIG. 10 is a perspective view illustrating a modified embodiment of the unfolding propeller unit type unmanned aerial vehicle in FIG. 8.
Figure 11:
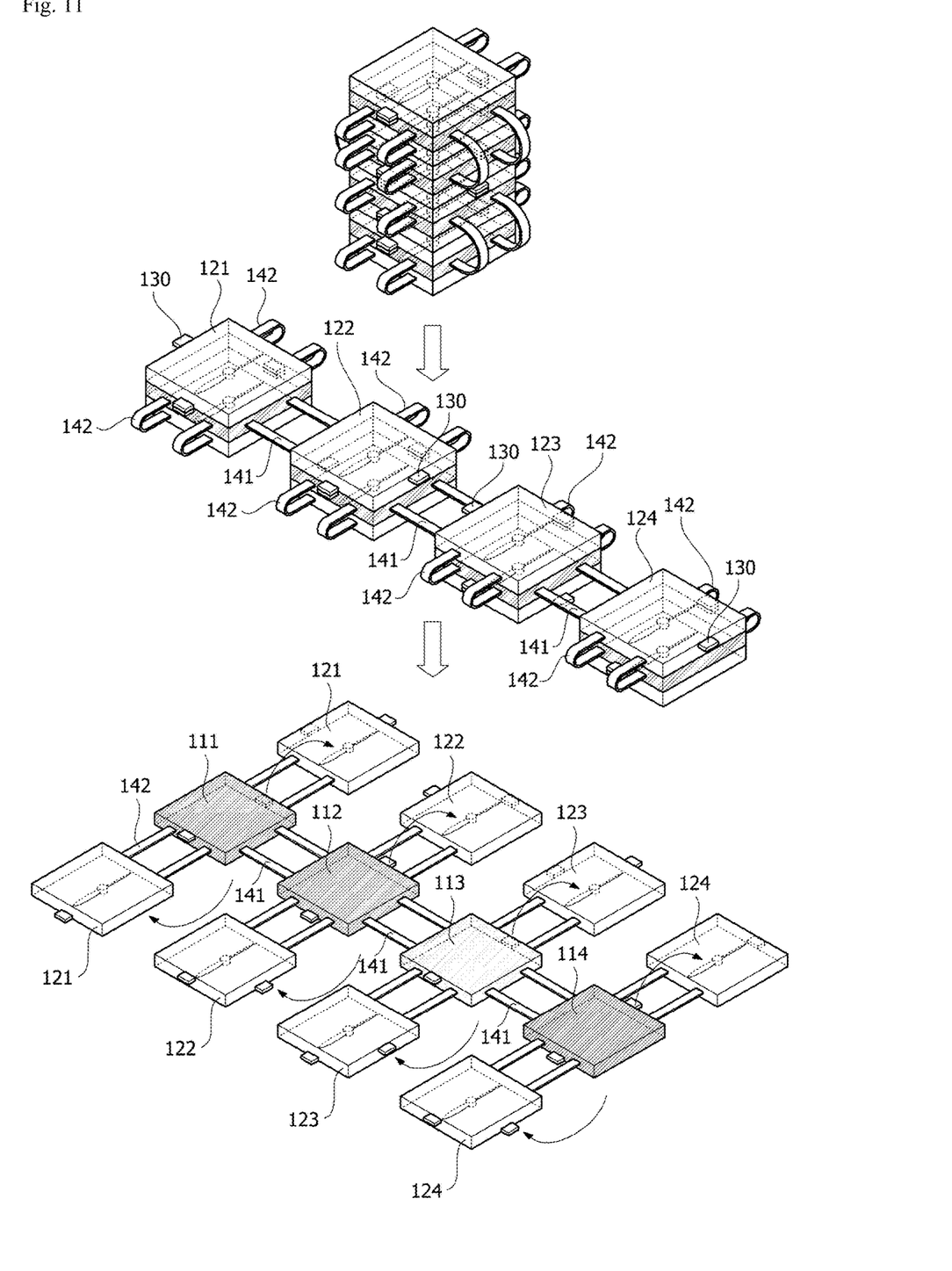
FIG. 11 is a view illustrating a process of switching the unfolding propeller unit type unmanned aerial vehicle in FIG. 10 from a folded state to an unfolded state.

FIG. 10 is a perspective view of a modified embodiment of the unfolding propeller unit type unmanned aerial vehicle in FIG. 8. Further, FIG. 11 illustrates a process of switching the unfolding propeller unit type unmanned aerial vehicle in FIG. 10 from a folded state to an unfolded state.

The embodiment shows a structure further extended from that of the separate body unit in the previous embodiment, and exemplifies a structure in which three or more body units are connected. In the embodiment, a structure in which four body units, that is, first to fourth body units 111 to 114, are connected by foldable units 141 is exemplified. However, the number of the body units is not limited thereto and the body units may be modified to be embodied in various numbers.

That is, the unfolding propeller unit type unmanned aerial vehicle in the embodiment includes the plurality of the body units 111 to 114 which may be disposed to overlap with each other, the body unit unfolders 141 configured to connect the body units 111 to 114 and switch the body units 111 to 114 from an overlapping state to an unfolded state, a plurality of propeller units 121 to 124 overlappable on the body units 111 to 114, and propeller unit unfolders 142 configured to connect the body units 111 to 114 and the propeller units 121 to 124 and unfold the propeller units 121 to 124 from the body units 111 to 114 when the body unit unfolders 141 perform an unfolding operation.

The body units 111 to 114 are connected in series by the body unit unfolders 141, and the propeller units 121 to 124 may be connected to the body units 111 to 114 by the propeller unit unfolders 142 in a direction different from a direction in which the body unit unfolders 141 connect the body units 111 to 114. In the embodiment shown in the drawings, the body unit unfolders 141 and the propeller unit unfolders 142 may be connected to surfaces of the body units 111 to 114 adjacent thereto.

In the embodiment shown in FIGS. 8 and 9, locking units 130 may be disposed between the propeller units which are in contact with each other in the folded state and between the body units and the propeller units overlapping on both sides of the body units.

Referring to FIG. 11, as locking of the locking units 130 is released, the body unit unfolders 141 perform an unfolding operation and the first and second body units 111 and 112 are unfolded first, and then the propeller units 121 to 124 connected to the body units 111 to 114 are unfolded from the body units by an unfolding operation of the propeller unit unfolders 142 second.

According to the embodiments, the number of the propeller units 120 may be increased without limitation by increasing the number of body units 110 and the components forming the body unit 110 may be disposed in a distributive manner or multiplex manner, and thus a lift force and a driving force of the unfolding propeller unit type unmanned aerial vehicle can be maximally increased.

According to the present invention including the above-described configurations, a propeller unit unfolder includes a tape spring hinge or a shape memory alloy hinge such that an unmanned aerial vehicle can be minimized for storage and portability and can be advantageous for drone flight formations Further, since an unmanned aerial vehicle of the present invention does not use supports and a set structure, a weight thereof can be lightened and a volume thereof can be minimized.

In addition, according to an unmanned aerial vehicle of the present invention, since tape spring hinges applied to propeller unit unfolders have flexibility, deformation and damage of body units and propeller units can be minimized.

In addition, an unmanned aerial vehicle can have components embedded in a distributive or multiplex manner through implementation of separate body units thereof, and the number of propeller units can be increased without limitation by increasing the number of body units.

The above-described unfolding propeller unit type unmanned aerial vehicle is not limited to the above-described configurations and methods, and may be variously modified by those skilled in the art without departing from the technical spirit of the present invention.

What is claimed is:

1. An unfolding propeller unit type unmanned aerial vehicle comprising:
   a body unit;
   a plurality of propeller units configured to be overlappable on the body unit;
   a locking unit configured to lock the propeller units and the body unit so that a state in which the propeller units are overlapping on the body unit is maintained; and
   propeller unit unfolders, each configured to connect each of the propeller units to the body unit and unfold the propeller units from the body unit so that the propeller units are positioned around the body unit when locking of the locking unit is released,
   wherein the plurality of the propeller units are sequentially stacked on one surface of the body unit.

2. The unmanned aerial vehicle of claim 1, wherein the propeller unit unfolder is elastically deformed to unfold the propeller unit through an elastic restoring force and is formed of a flexible material.

3. The unmanned aerial vehicle of claim 2, wherein the propeller unit unfolder includes a tape spring hinge or a shape memory alloy hinge.

4. The unmanned aerial vehicle of claim 1, wherein the propeller unit unfolders are installed at a plurality of positions along a circumference of the body unit.

5. An unfolding propeller unit type unmanned aerial vehicle comprising:
   a body unit;
   a plurality of propeller units configured to be overlappable on the body unit;
   a locking unit configured to lock the propeller units and the body unit so that a state in which the propeller units are overlapping on the body unit is maintained; and
   propeller unit unfolders, each configured to connect each of the propeller units to the body unit and unfold the propeller units from the body unit so that the propeller units are positioned around the body unit when locking of the locking unit is released, wherein
   some of the plurality of the propeller units are sequentially stacked on one surface of the body unit; and
   the remaining propeller units are sequentially stacked on the other surface of the body unit.

6. The unmanned aerial vehicle of claim 1, wherein the locking unit includes a mechanical type locking device which is manually unlocked or an electronic type locking device which is unlocked in response to a control signal transmitted from the body unit.

7. An unfolding propeller unit type unmanned aerial vehicle comprising:
   a body unit;
   a plurality of propeller units configured to be overlappable on the body unit;
   a locking unit configured to lock the propeller units and the body unit so that a state in which the propeller units are overlapping on the body unit is maintained; and
   propeller unit unfolders, each configured to connect each of the propeller units to the body unit and unfold the propeller units from the body unit so that the propeller units are positioned around the body unit when locking of the locking unit is released,
   wherein the body unit includes a first body unit and a second body unit connected to each other so that the first body unit and the second body unit in an overlapping state are unfolded by body unit unfolders.

8. An unfolding propeller unit type unmanned aerial vehicle comprising:
   a plurality of body units configured to be overlappable with each other;
   body unit unfolders configured to connect the plurality of the body units and switch the body unit from an overlapping state to an unfolded state;
   a plurality of propeller units configured to be overlappable on the body units; and
   propeller unit unfolders configured to connect the body units and the propeller units and unfold the propeller units from the body units when the body unit unfolders unfolds.

9. The unmanned aerial vehicle of claim 8, wherein:
   the body units are connected in series by the body unit unfolders; and
   the propeller units are connected to the body units by the propeller unit unfolders in a direction different from a direction in which the body unit unfolders connect the body units.

* * * * *